United States Patent [19]

Blake et al.

[11] 3,992,554

[45] Nov. 16, 1976

[54] PROCESS FOR PRODUCING LOW CALORIE PASTA

[75] Inventors: Jon R. Blake; Harold E. Miller, both of Minneapolis, Minn.

[73] Assignee: General Mills, Inc., Minneapolis, Minn.

[22] Filed: July 21, 1975

[21] Appl. No.: 597,847

[52] U.S. Cl. .............................. 426/557; 426/451; 426/459; 426/804
[51] Int. Cl.² ........................................... A23L 1/16
[58] Field of Search ............ 426/557, 451, 804, 459

[56] References Cited
UNITED STATES PATENTS 3,843,818  10/1974  Wren et al. ......................... 426/557

*Primary Examiner*—Raymond N. Jones
*Attorney, Agent, or Firm*—Gene O. Enockson; Norman P. Friederichs

[57] ABSTRACT

A method is disclosed for preparing a high fiber, low-calorie pasta. A mixture is prepared which may include cereal material, oil seed endosperm cell wall residues, vegetable protein, calcium carbonate, vegetable gum, and water. The mixture may be extruded and/or shaped to form the pasta.

10 Claims, No Drawings

PROCESS FOR PRODUCING LOW CALORIE PASTA

BACKGROUND OF THE INVENTION

The present invention relates to food products and more particularly to a method for preparing low calorie pasta products.

Control of caloric intake has become an ever-increasing concern for many people. For this reason, low calorie food products are commonly found on grocery store shelves. In some instances, calorie reduction per serving is obtained merely by reducing the size of the edible portion, for example, thin-sliced bread. However, in most instances, calorie reduction is obtained by including a non-assimilable material in the food product. The non-asimilable material may be provided for flavoring purposes or for bulking purposes. Typical of such non-assimilable bulking material is finely ground rice hulls and soybean hulls. Flavoring replacement is illustrated in the case where sugar, which is a nutritive sweetener, is replaced in whole or in part, by saccharin, a non-nutritive sweetener.

THE PRESENT INVENTION

The present invention relates to pasta products such as macaroni, spaghetti, noodles, and the like, in which bulk is increased with certain non-assimilable material, together with increased water content in the final cooked pasta product. It has been found that the oil seed endosperm cell wall residue is non-assimilable thereby reducing the calorie content of the present pasta. Further, the oil seed endosperm cell wall residue increases the water take-up capacity of the pasta during cooking while maintaining acceptable pasta texture, thus further increasing the bulk and reducing the calorie content for a given weight of cooked product. The moisture content of the final cooked pasta product may, for example, be about 80 percent by weight. The present invention provides pasta products with excellent taste and textural characteristics and yet provides pasta products in which the calorie content may be reduced 50 percent or more in the form consumed.

The present pasta includes from 10 to 50 percent oil seed cell wall residue, up to 30 percent polygalactomannan or other vegetable gum, and from 40 to 80 percent of a mixture of vegetable protein and cereal material. The terms "percent," "parts" and the like, as used herein, will refer to percent and parts by dry weight, unless otherwise specified.

The term "oil seed cell wall residue" and the like, as used herein, will refer to that portion of oil seed endosperm remaining after a significant portion of the protein has been removed, for example, by alkaline solubilization of the protein. Technique for such removal of the protein is well known particularly in the art of preparing vegetable protein concentrates and isolates. Defatted oil seed flour may be mixed with water to form a slurry which may be treated with either an acidic or an alkaline material to adjust the pH beyond the isoelectric point of the protein thereby solubilizing a substantial portion of the protein. The slurry is then centrifuged to remove the insoluble material which is the oil seed endosperm cell wall residue. Illustrative of such preparation is the processing of defatted soy flour. The soy flour is mixed with water to form a slurry having 90 percent water, by weight. Sodium hydroxide is added in an amount sufficient to raise the pH to about 8. The slurry is then centrifuged to remove the insoluble oil seed endosperm cell wall residue. If desired, the oil seed endosperm cell wall residue may be dried.

The oil seed endosperm cell wall residue may be a fine, flour-like material or may be a coarse, meal-like material. The residue may be granular or flaked. Such oil seed endosperm cell wall residue is the non-starchy polysaccharide portion and includes cellulose, hemicellulose, oil seed plant gums, and pectic substances (typified by polygalaturonic acid commonly called pectin). Illustrative of the oil seed sources include soybean, rapeseed, peanuts, cottonseed, sesame seed and the like. Some of the vegetable protein may remain in the residue. The preferred source is soybean. It has been found that the oil seed endosperm cell wall residue has about 1 calorie per gram, dry weight. The oil seed endosperm cell wall residue may be present in an amount from about 2 to 60 percent, preferably 10 to 50 percent.

The gum, if present, may be polygalactomannan gum which is typically found in the endosperm sections of such seeds as guar, locust bean, honey locust, flame tree and Cassia occidentalis. The polygalactomannan vegetable gum preferably is guar gum, or locust bean gum. Alternatively, the gum may be a mixture such as guar gum and locust bean gum, (for example, a 1:1 mixture). The gum may alternatively be any other vegetable gum such as carboxymethylcellulose, pectin, methocel, alginate, carageenan, xanthan, or other hydrophylic nondigestable polysaccharides. The gum preferably may be present in an amount from about 1 to 20 percent.

The cereal material is preferably a flour, such as durum flour; however, any cereal flour or starch may be used. The cereal material is preferably present in an amount of about 10 to 75 percent.

The vegetable protein material may be, for example, vital gluten. The vital gluten may be present at a level of about 5 to 30 percent, preferably about 10 to 20 percent. A tougher product may be provided by increasing the protein level and reducing the cereal level, whereas a softer product may be provided by decreasing the protein level and increasing the cereal level.

Various other materials may be added, such as coloring material, flavoring material, and protein or gluten relaxing agents such as cysteine and sodium bisulfite.

The pasta product may be prepared by mixing the dry materials such as oil seed endosperm cell wall residue, protein, cereal material, and the gum. Sufficient water may be added to raise the moisture content to between about 20 and 45 percent, preferably about 35–40 percent moisture based on the total weight of the mixture. The hydrated mixture preferably is in a free-flowing granular form. The water may include some acid such as acetic acid for purposes of increasing the whiteness of the finished product and reducing the stickiness during processing. The acetic acid may be added, for example, in an amount of 0.5 to 1.0 percent based on the weight of the dry materials.

The hydrated mixture may then be treated in a conventional pasta or plastics extruder where the mixture is worked until the gluten coalesces and binds all the materials together. The mixture is then extruded in the desired shape. Alternatively, the pasta may be prepared by conventional sheeting techniques. The resulting pasta product may be dried or dehydrated by conventional means which typically may be carried out for between 30 minutes and 20 hours.

The pasta product may be cooked just prior to consumption by boiling in water for between 7 to 30 minutes.

The following examples are for purposes of illustrating the present invention.

EXAMPLE I

Low calorie pasta was prepared according to the present invention by dry blending the following materials: Durum semolina 30.71 parts, durum flour 5.92 parts, vital gluten 29.59 parts, soybean endosperm cell wall residue. The soybean endosperm cell wall residue was prepared by mixing water and soy flour to form a slurry having a 10% solids content. The pH was raised to 7.8 and the slurry was centrifuged. The residue was washed and centrifuged again. The resulting cell wall residue was dehydrated by spray drying. The soybean cell wall residue was found to have 73 percent dietary fiber of which 14 percent is crude fiber, 17 percent protein, 0.3 percent fat, 4 percent ash, 5 percent moisture. The residue had a particle size distribution as follows:

78 percent retained by an ASTM Sieve No. 325
42 percent retained by an ASTM Sieve No. 230
18 percent retained by an ASTM Sieve No. 200
2 percent retained by an ASTM Sieve No. 120

Trace retained by an ASTM Sieve No. 80 14.79 parts, cellulose 11.83 parts, guar gum 2.96 parts, calcium carbonate 4.14 parts, egg albumin 4 parts, oleoresin carrot 0.04 parts, yellow (No. 5) 0.02 parts. The dry blend was fed into a Strong Scott Turbulizer at a rate of about 2.5 pounds per minute, and a water rate of 1.4 pounds per minute. The Turbulizer was adjusted to between about 700 and 900 r.p.m. The material was removed and held for a time sufficient to provide uniform hydration. The hydrated material was then extruded at a temperature of about 50° C. The extruded pasta was cut and then dried in a Buhler drier at 35 percent humidity with a dry bulb temperature of 70° C. and a retention time of about 60 minutes.

EXAMPLE II

Low calorie pasta was prepared according to the present invention by dry blending the following: Durum semolina 41.3 parts, vital gluten 17 parts, soybean endosperm cell wall residue 30.8 parts, guar gum 4 parts, calcium carbonate 3 parts, egg albumin 4 parts, oleoresin carrot 0.04 parts, and yellow (No. 5) 0.02 parts. The dry blend was fed into a Strong Scott Turbulizer at a rate of 2.5 pounds per minute, and a water feed rate of 1.4 pounds per minute. The Turbulizer was adjusted to between about 700 and 900 r.p.m. The material was removed and tempered for a time sufficient to provide uniform hydration. The hydrated material was then extruded at a temperature of about 55° C. The extruded pasta was cut and then dried in a Buhler drier at 35 percent humidity with a dry bulb temperature of 70° C. and a time of about 60 minutes.

EXAMPLE III

Low calorie pasta was prepared substantially as described in Example II; however, the dry blend was fed into a conventional pasta pre-mixer at a rate of 2.5 pounds per minute. Water was fed into the pre-mixer at a rate of 1.4 pounds per minute. The mixer was adjusted to convey the mixture at a rate which provided complete and uniform hydration. The hydrated material was then extruded at a temperature of about 55° C. The extruded pasta was cut and then dried in a Buhler drier at 35 percent humidity with a dry bulb temperature of 70° C. and a time of about 60 minutes.

Various other ingredients may be added to the mixture prior to extrusion without departing from the broader scope of the present invention. For example, various other nondigestable plant tissue may be added such as citrus albedo, sugar beet pulp, turnip tissue, corn bran, melon rind tissue and the like.

The embodiments of the invention in which an exclusive property or privilege is claimed are defined as follows:

1. A method for preparing a low calorie pasta comprising mixing cereal material, vegetable protein, and oil seed endosperm cell wall residue, the combination of cereal material and vegetable protein being present in an amount of from about 40 to 80 percent, dry weight basis; the oil seed endosperm cell wall residue being present in an amount of from about 2 to 60 percent, dry weight basis, said cell wall residue being the non-starchy polysaccharide portion of the oil seed endosperm comprising a mixture of cellulose, hemicellulose, oil seed plant gum and pectic substances; adjusting the moisture content of said mixture to between about 12 to 45 percent by weight, working the mixture sufficient to coalesce said protein and bind said hydrated mixture together and shaping said mixture to form a pasta product.

2. The method of claim 1 wherein the oil seed endosperm cell wall residue is present in an amount of from 10 to 50 percent dry weight basis.

3. The method of claim 2 wherein said non-starchy polysaccharide portion is obtained by extracting a substantial portion of the protein from soybean material.

4. The method of claim 3 wherein said protein is extracted by solubilizing the protein with alkaline material.

5. The method of claim 1 wherein said cereal material is present in an amount of from about 10 to 75 percent dry weight basis.

6. The method of claim 5 wherein said vegetable protein is vital gluten.

7. The method of claim 6 wherein said gluten is present in an amount of about 5 to 30 percent dry weight basis.

8. The method of claim 7 wherein said gluten is present in an amount of between 10 and 20 percent.

9. The method of claim 1 wherein vegetable gum is added in an amount of up to 30 percent, dry weight basis.

10. The method of claim 1 wherein said vegetable gum is polygalactomannan gum and wherein said gum is present in an amount of from about 1 to 20 percent.

* * * * *

UNITED STATES PATENT OFFICE
CERTIFICATE OF CORRECTION

Patent No. 3,992,554  Dated November 16, 1976

Inventor(s) Jon R. Blake et al.

It is certified that error appears in the above-identified patent and that said Letters Patent are hereby corrected as shown below:

Column 3, line 2 - Insert -- about -- after "between" and before "7".

Column 3, line 13 - After the first "wall residue", remove "." and insert -- * --.

Column 3, lines 13-29, "The soybean endosperm cell wall residue was prepared by mixing water and soy flour to form a slurry having a 10% solids content. The pH was raised to 7.8 and the slurry was centrifuged. The residue was washed and centrifuged again. The resulting cell wall residue was dehydrated by spray drying. The soybean cell wall residue was found to have 73 percent dietary fiber of which 14 percent is crude fiber, 17 percent protein, 0.3 percent fat, 4 percent ash, 5 percent moisture. The residue has a particle size distribution as follows:

UNITED STATES PATENT OFFICE
CERTIFICATE OF CORRECTION

Patent No. 3,992,554      Dated November 16, 1976

Inventor(s) Jon R. Blake etal.

It is certified that error appears in the above-identified patent and that said Letters Patent are hereby corrected as shown below:

78 percent retained by an ASTM Sieve #325

42 percent retained by an ASTM Sieve #230

18 percent retained by an ASTM Sieve #200

2 percent retained by an ASTM Sieve #120

Trace retained by an ASTM Sieve #80" should be inserted as a footnote after Column 3, line 43, and before "EXAMPLE II".

Signed and Sealed this

Fourteenth Day of June 1977

[SEAL]

Attest:

RUTH C. MASON
*Attesting Officer*

C. MARSHALL DANN
*Commissioner of Patents and Trademarks*